United States Patent
Morenko et al.

(10) Patent No.: US 8,037,690 B2
(45) Date of Patent: Oct. 18, 2011

(54) FUEL MANIFOLD FOR GAS TURBINE ENGINE

(75) Inventors: Oleg Morenko, Oakville (CA); Robert Richard Davis, Guelph (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 482 days.

(21) Appl. No.: 12/336,912

(22) Filed: Dec. 17, 2008

(65) Prior Publication Data

US 2010/0146928 A1    Jun. 17, 2010

(51) Int. Cl.
*F02C 1/00* (2006.01)

(52) U.S. Cl. .................... 60/739; 60/734; 60/39.094

(58) Field of Classification Search .............. 60/734, 60/739, 740, 741, 746, 39.094
See application file for complete search history.

(56) References Cited

U.S. PATENT DOCUMENTS

| | | | |
|---|---|---|---|
| 4,028,888 A | 6/1977 | Pilarczyk | |
| 4,036,246 A * | 7/1977 | Cornell | 137/118.02 |
| 4,467,610 A * | 8/1984 | Pearson et al. | 60/739 |
| 4,903,478 A * | 2/1990 | Seto et al. | 60/39.281 |
| 5,031,407 A * | 7/1991 | Zaremba et al. | 60/739 |
| 5,054,280 A | 10/1991 | Ishibashi et al. | |
| 5,168,698 A | 12/1992 | Peterson et al. | |
| 5,211,005 A | 5/1993 | Hovnanian | |
| 5,259,185 A | 11/1993 | Peterson | |
| 5,261,240 A | 11/1993 | Oyler et al. | |
| 5,263,314 A | 11/1993 | Anderson | |
| 5,415,000 A | 5/1995 | Mumford et al. | |
| 6,282,904 B1 | 9/2001 | Kraft et al. | |
| 6,289,676 B1 | 9/2001 | Prociw et al. | |
| 6,339,924 B1 | 1/2002 | Hoyer et al. | |
| 6,837,052 B2 | 1/2005 | Martling | |
| 7,137,256 B1 | 11/2006 | Stuttaford et al. | |
| 7,415,828 B2 | 8/2008 | Brown | |
| 7,607,226 B2 * | 10/2009 | Patel et al. | 29/890.08 |

* cited by examiner

*Primary Examiner* — Louis Casaregola
*Assistant Examiner* — Phutthiwat Wongwian
(74) *Attorney, Agent, or Firm* — Norton Rose OR LLP

(57) ABSTRACT

A fuel manifold for a gas turbine engine comprises manifold adaptors each supporting a nozzle for outputting fuel from a fuel supply. The manifold adaptors have a primary conduit and a secondary conduit extending between connection ends of the manifold adaptor. The primary conduit and the secondary conduit are in fluid communication with the nozzle to supply fuel thereto. Transfer units are between adjacent manifold adaptors, and each comprises a primary transfer tube matingly connected at opposite ends to the primary conduits of the adjacent manifold adaptors for fuel circulation between the primary conduits. A secondary transfer tube in each transfer unit is matingly connected at opposite ends to the secondary conduits of the adjacent manifold adaptors for fuel circulation between the secondary conduits. A drain sleeve in each transfer unit is connected at opposite ends to the adjacent manifold adaptors.

15 Claims, 5 Drawing Sheets

FUEL MANIFOLD FOR GAS TURBINE ENGINE

TECHNICAL FIELD

The application relates generally to combustors for gas turbine engines and, more particularly, to a fuel manifold configuration.

BACKGROUND OF THE ART

Fuel manifolds for gas turbine engines may be assembled from a sequence of manifold adaptors and transfer tubes. The manifold adaptors support nozzles for injection of fuel in the combustor. Transfer tubes interconnect manifold adaptors, and form primary and secondary fuel-supply networks therewith, to supply the nozzles with fuel. There is a risk of fuel leak at the connection between transfer tubes and the manifold adaptors. Accordingly, there is a need to provide an improved fuel manifold configuration.

SUMMARY

It is therefore an object to provide a novel fuel manifold for gas turbine engines.

In one aspect, there is provided a fuel manifold for a gas turbine engine comprising: manifold adaptors each supporting a fuel nozzle for outputting fuel from a fuel supply, each manifold adaptor having a primary conduit and a secondary conduit extending between connection ends of the manifold adaptor, the primary conduit and the secondary conduit being side-by-side and respectively in fluid communication with the fuel nozzle to supply fuel thereto; transfer units between adjacent manifold adaptors, each transfer unit comprising: a primary transfer tube extending between and sealingly matingly connected at opposite ends to the primary conduits of the adjacent manifold adaptors, the primary transfer tube configured for fuel circulation between the primary conduits; a secondary transfer tube extending between and sealingly matingly connected at opposite ends to the secondary conduits of the adjacent manifold adaptors, the secondary transfer tube configured for fuel circulation between the secondary conduits, the primary and secondary transfer tube being disposed side-by-side; and a drain sleeve extending between and sealingly connected at opposite ends to the adjacent manifold adaptors, the drain sleeve accommodating both the primary transfer tube and the secondary transfer tube substantially along the tubes respective lengths, the drain sleeve sealingly containing the primary and secondary tubes so as to contain any fuel leaks from at least one of the primary and secondary tubes and the junction of the conduits and the transfer tubes.

In a second aspect, there is provided a fuel manifold for a gas turbine engine comprising: manifold adaptors each supporting a nozzle for outputting fuel from a fuel supply, each manifold adaptor having a primary conduit and a secondary conduit extending between connection ends of the manifold adaptor, the primary conduit and the secondary conduit being in fluid communication with the nozzle to supply fuel thereto; transfer units between adjacent manifold adaptors, each transfer unit comprising: a primary transfer tube matingly connected at opposite ends to the primary conduits of the adjacent manifold adaptors for fuel circulation between the primary conduits, with seals provided between the primary transfer tube and the primary conduits, and at least one guide surface on a periphery of the primary transfer tube; and a secondary transfer tube matingly connected at opposite ends to the secondary conduits of the adjacent manifold adaptors for fuel circulation between the secondary conduits, with seals provided between the secondary transfer tube and the secondary conduits, and at least one complementary guide surface on a periphery of the secondary transfer tube, the complementary guide surface cooperating with the guide surface of the primary transfer tube when the primary transfer tube and the secondary transfer tube are connected between the adjacent manifold adaptors, whereby the primary transfer tube and the secondary transfer tube are prevented from rotating by the cooperation between the guide surfaces.

DESCRIPTION OF THE DRAWINGS

Reference is now made to the accompanying figures, in which.

DETAILED DESCRIPTION

Figure 1:
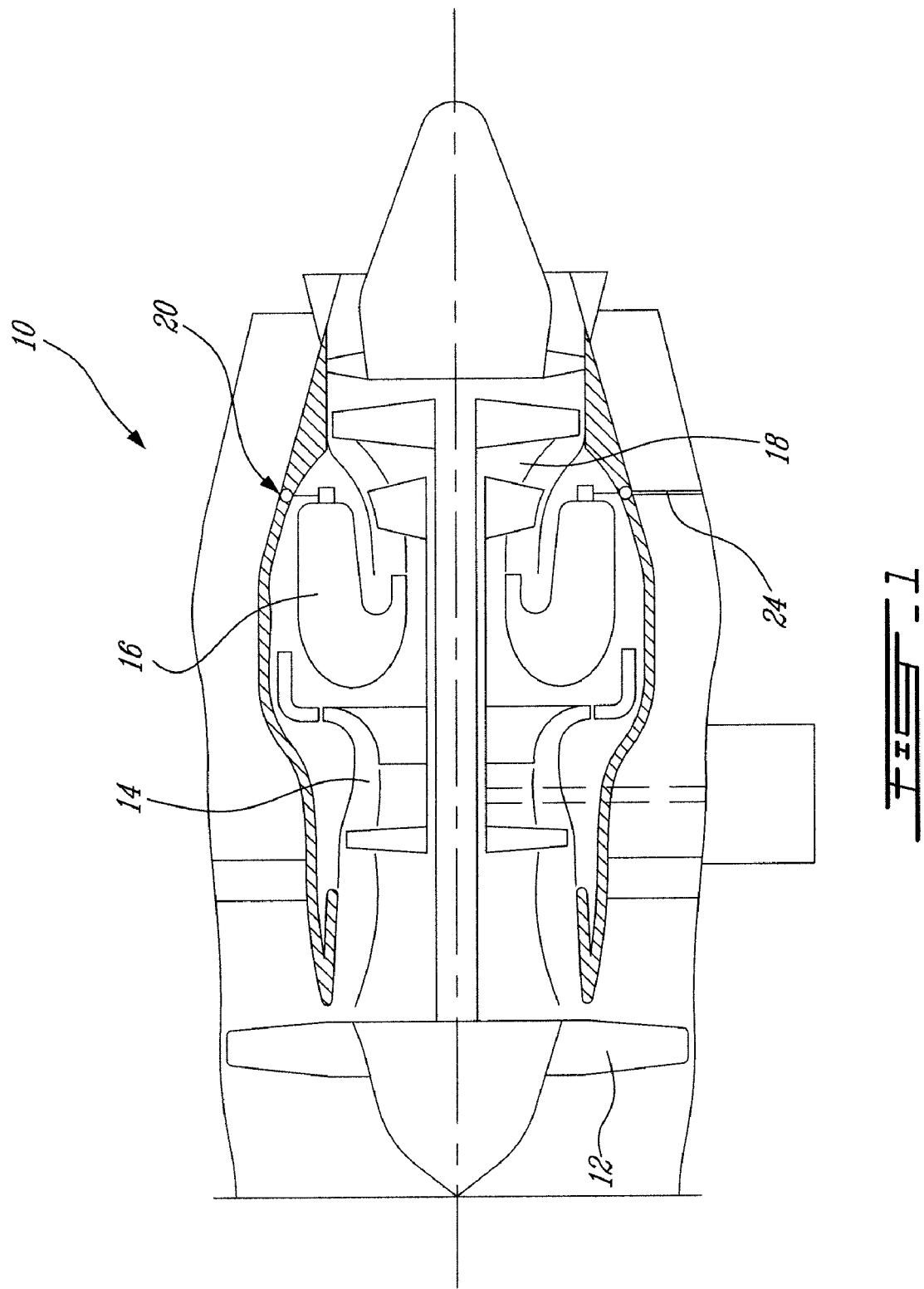
FIG. 1 is a schematic cross-sectional view of a turbofan gas turbine engine employing a fuel manifold according to an embodiment of the present disclosure.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel provided by a manifold 20 and ignited for generating an annular stream of hot combustion gases, and a turbine section 18 for extracting energy from the combustion gases.

Figure 2:
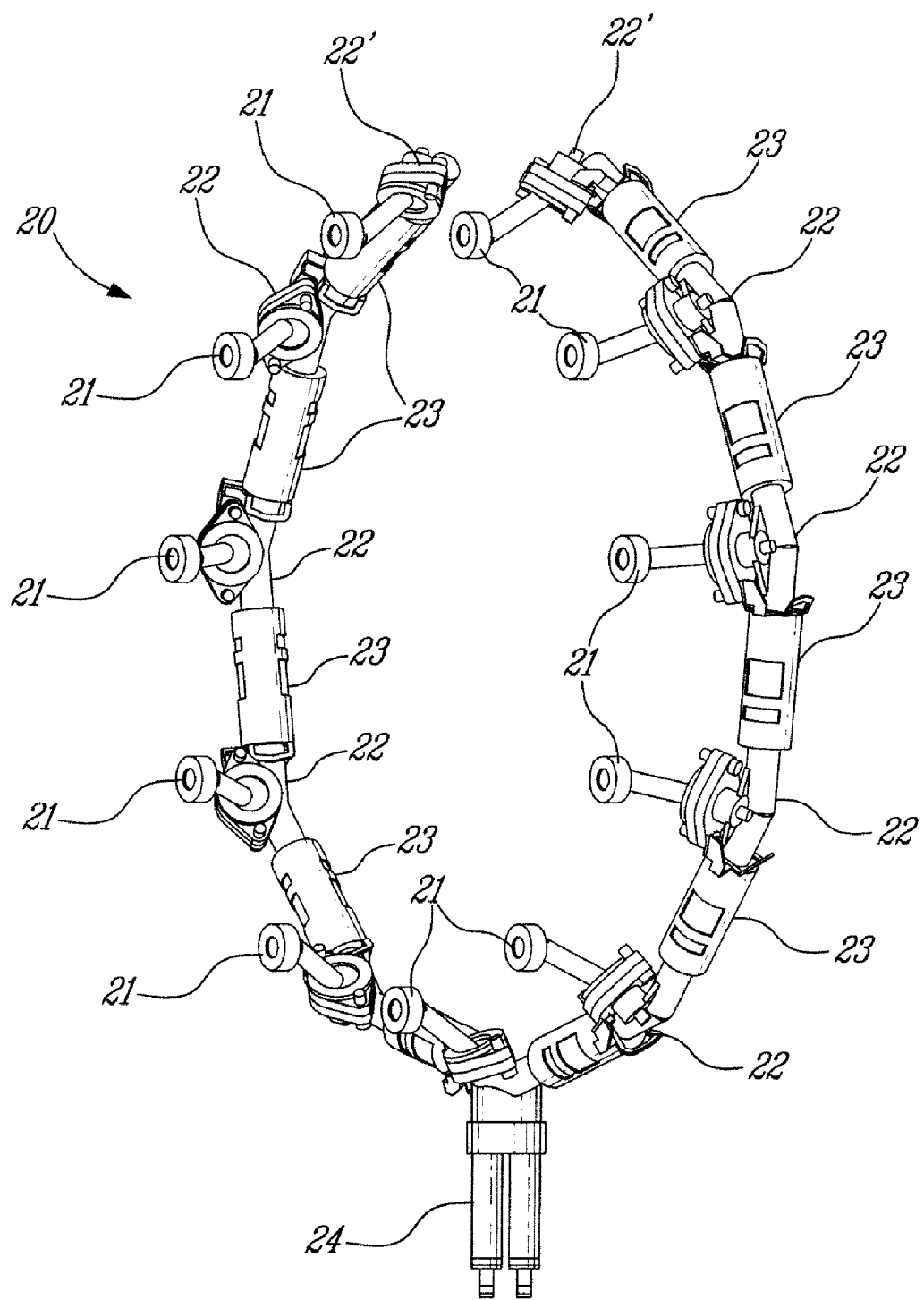
FIG. 2 is a schematic perspective view of the fuel manifold of FIG. 1.

Referring to FIG. 2, the fuel manifold 20 has an annular shape, with a plurality of fuel nozzles 21 oriented toward an interior of the annular shape.

The fuel manifold 20 has a sequence of manifold adaptors 22 and transfer units 23 forming the annular shape of the manifold 20. The nozzles 21 are each connected to one of the manifold adaptors 22, so as to receive a fuel supply therefrom. The transfer units 23 form a fuel-circulation network with the manifold adaptors 22, for fuel to be fed to all of the nozzles 21, from a fuel supply/drain 24. The fuel-circulation network may have drain conduits for drainage of fuel in the event of a fuel leak.

Figure 3:
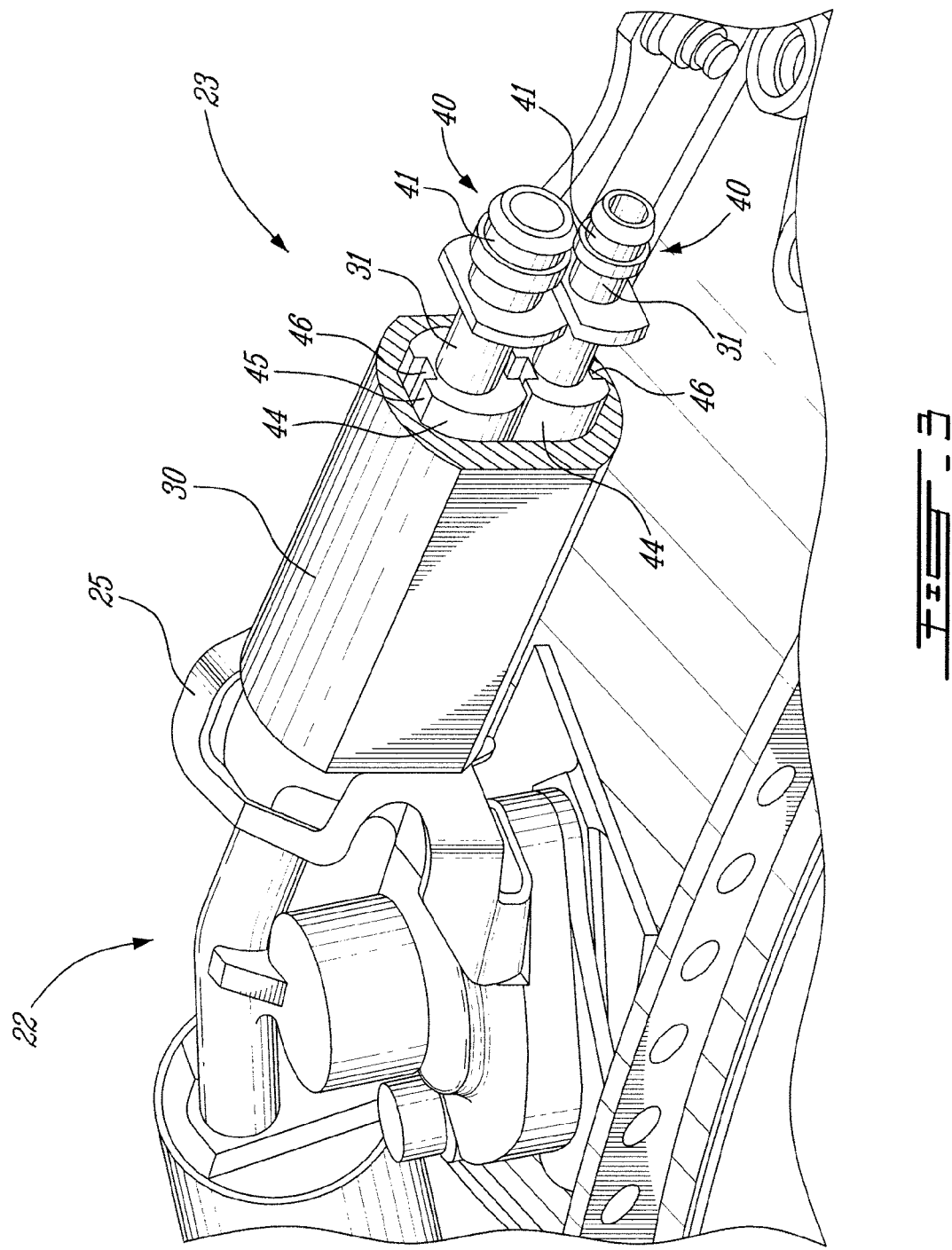
FIG. 3 is a schematic perspective view of a transfer unit and manifold adaptor of the fuel manifold of FIG. 2.
Figure 4:
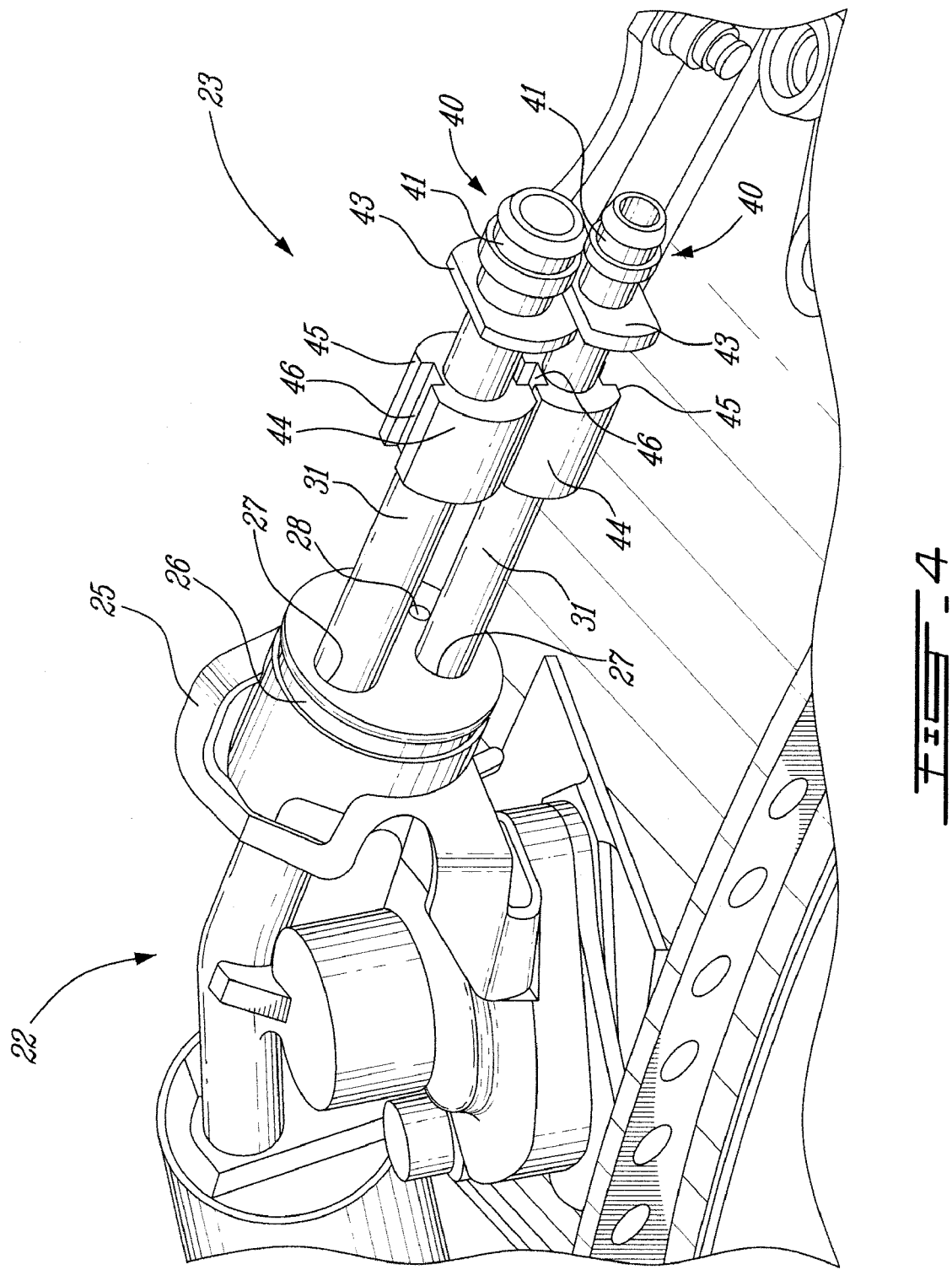
FIG. 4 is a schematic perspective view of the transfer unit and manifold adaptor of FIG. 3, the drain sleeve being omitted for clarity purposes, the transfer unit being shown in the process of being connected to a second fuel adaptor.

Referring concurrently to FIGS. 3 and 4, one of the transfer units 23 is shown connected at a first connection end to one of the manifold adaptors 22. Each manifold adaptor 22 has a bracket 25 and a radial channel or shoulder 26 at one end, as well as supply conduits 27 (i.e., a primary and a secondary conduit), and a drain conduit 28. The bracket 25 is used as an abutment to limit movement of a drain sleeve 30 of the transfer unit 23. The radial channel 26 receives a seal (e.g., O-ring), to ensure the water tightness of the joint between the drain sleeve 30 and the manifold adaptor 22. The supply conduits 27 and the drain conduit 28 form the fuel-circulation network, and extend from end to end in the manifold adaptors 22.

Figure 5:
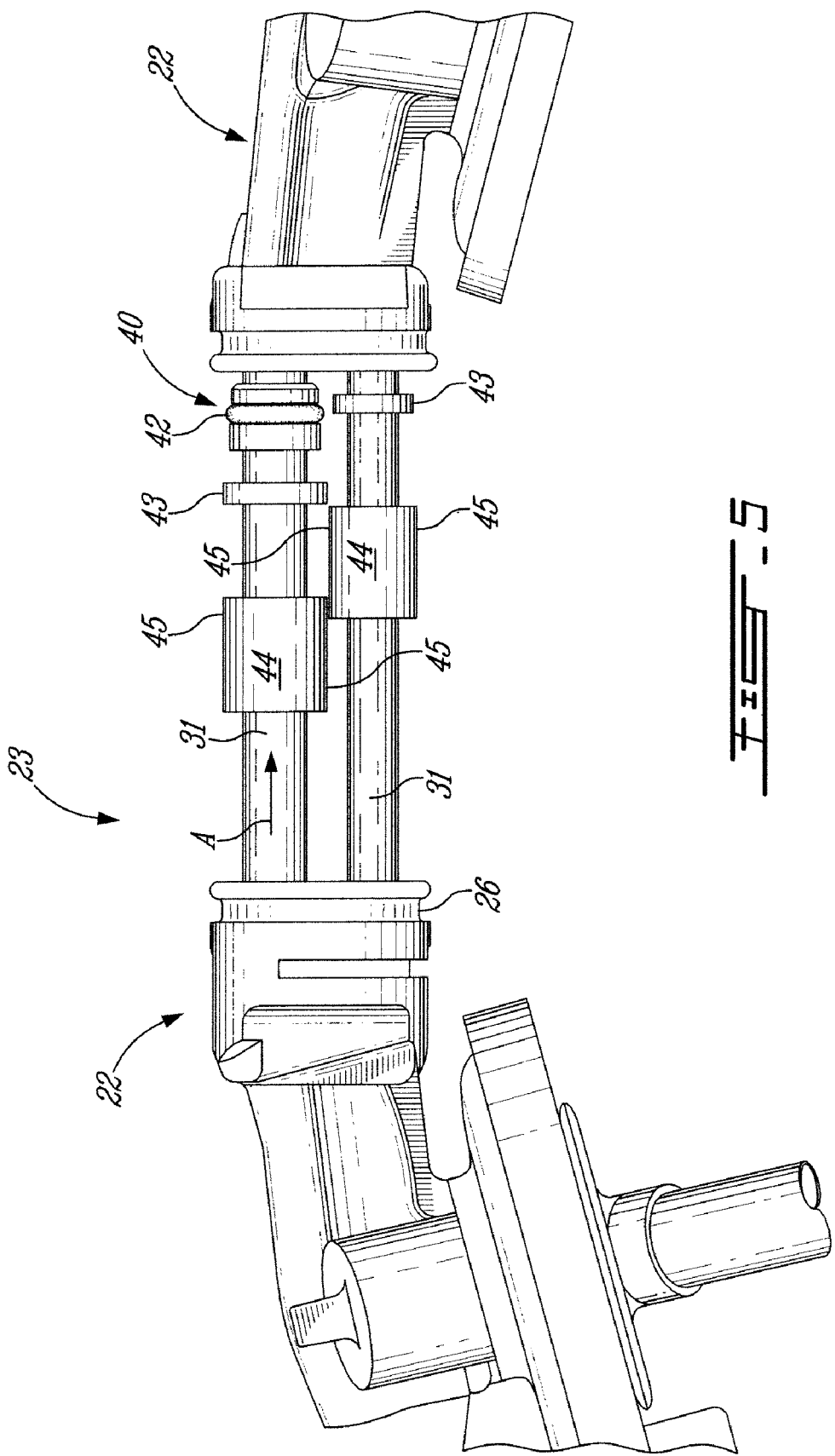
FIG. 5 is a schematic elevation view of the transfer unit and manifold adaptor of FIG. 4, the transfer unit being shown in a fully interconnected state at both ends thereof.

Referring concurrently to FIGS. 4 to 5, in addition to the drain sleeve 30, the transfer units 23 each feature a pair of transfer tubes 31, with each transfer tube 31 allowing the fuel-circulation communication between adjacent manifold adaptors 22. Each transfer tube 31 may have a pair of heads 40 (one of which is shown in FIGS. 4 and 5) at opposite ends, for mating interconnection into the conduits 27 at the ends of the manifold adaptors 22. The transfer tubes 31 are illustrated as forming the male connector, but may also be used as female connectors, or as female connector at a first end and a male connector at a second end, with appropriate connectors in the manifold adaptors 22.

The head 40 of the transfer tubes 31 may have a radial channel 41 to receive a seal 42 (e.g., an O-ring or the like, as shown in FIG. 5). The seal 42 ensures the water tightness between the transfer tube 31 and the supply conduit 27 within the manifold adaptor 22. A similar head 40 or other configuration may be provided at opposite ends of the transfer tube 31. A flange 43 is positioned on a periphery of the transfer tube 31, and provides a grip to manipulate the transfer tube 31 into and out of engagement with the manifold adaptor 22.

The transfer tubes 31 each have a guide block 44 projecting radially therefrom. The guide block 44 may have one or more guide surfaces 45. In FIGS. 4 and 5, the guide block 44 has a pair of parallel guide surfaces 45. The guide surfaces 45 are generally flat, and may have a drain channel 46.

Referring to FIG. 5, the guide blocks 44 are shown from an elevation view. The guide blocks 44 are sized as a function of the spacing between the conduits 27 of the manifold adaptor 22, whereby the transfer tubes 31 must be oriented guide surface 45 against guide surface 45 to be concurrently fitted into the conduits 27. As is shown by arrow A in FIG. 5, one of the transfer tubes 31 may be guided by sliding contact with the other transfer tube 31 into mating engagement with the appropriate conduit 27. Moreover, because of the complementary contact between the guide surfaces 45 of the side-by-side transfer tubes 31, the transfer tubes 31 are prevented from rotating about their longitudinal axis. Alternatives to the guide blocks 44 may be used, such as flanges, fins and the like, to prevent rotation of the transfer tubes 31, and/or to guide the transfer tubes 31 into mating engagement with the manifold adaptors 22.

Although they are illustrated as being generally flat, the guide surfaces 45 may have also shapes and configurations, as long as the guide surfaces 45 of side-by-side transfer tubes 31 are in complementary engagement. The complementary engagement of the guide blocks 44 prevents contact between the seal 42 of a transfer tube 31 with the flange 43 of the adjacent transfer tube 31, as the guide blocks have a greater sectional area and sectional height than that of the flanges 43. The seal 42 is protected from being damaged by the adjacent flange 43 during assembly (e.g., during the translation of the transfer tube 31 along arrow A in FIG. 5). Moreover, the contact between the guide blocks 44 reduces the impact of fretting of the transfer tubes 31.

Referring to FIG. 3, the drain sleeve 30 may have an inner section shaped for blocking engagement with the guide blocks 44. For instance, the obround section illustrated in FIG. 3 blocks the rotation of the drain sleeve 30 about its longitudinal axis, by the drain sleeve 30 being blocked by the guide blocks 44. As the inner section of the drain sleeve 30 generally matches the shape of the guide blocks, fuel in the drain sleeve 30 circulates through the drain channels 46 in the guide blocks 44.

In case of any fuel leak between the transfer tubes 31 and the conduits 27 of the manifold adaptors 22, the drain sleeve 30 collects the leaked fuel. The fuel may be drained mainly by pressurization but also by gravity, passing though the fuel-circulation network, and more specifically through the drain conduits 28 in the manifold adaptors 22 and the drain sleeves 30. The fuel supply/drain 24 may collect the drained fuel and dispose same through the dedicated systems.

Referring to FIG. 2, manifold adaptors 22' are provided at the top of the fuel manifold 20. As illustrated, the manifold adaptors 22' are not interconnected to one another by one of transfer units 23. Accordingly, the supply conduits 27 and the drain conduit 28 are closed at one end, using appropriate means.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A fuel manifold for a gas turbine engine comprising:
manifold adaptors each supporting a fuel nozzle for outputting fuel from a fuel supply, each manifold adaptor having a primary conduit and a secondary conduit extending between connection ends of the manifold adaptor, the primary conduit and the secondary conduit being side-by-side and respectively in fluid communication with the fuel nozzle to supply fuel to a combustor of the gas turbine engine;
transfer units between adjacent manifold adaptors, each transfer unit comprising: a primary transfer tube extending between and sealingly matingly connected at opposite ends to the primary conduits of the adjacent manifold adaptors, the primary transfer tube configured for fuel circulation between the primary conduits;
a secondary transfer tube extending between and sealingly matingly connected at opposite ends to the secondary conduits of the adjacent manifold adaptors, the secondary transfer tube configured for fuel circulation between the secondary conduits, the primary and secondary transfer tube being disposed side-by-side; and
a drain sleeve extending between and sealingly connected at opposite ends to the adjacent manifold adaptors, the drain sleeve accommodating both the primary transfer tube and the secondary transfer tube substantially along the tubes respective lengths, the drain sleeve sealingly containing the primary and secondary tubes so as to contain any fuel leaks from at least one of the primary and secondary tubes and the junction of the conduits and the transfer tubes, the drain sleeve in fluid communication with the manifold adaptor.

2. The fuel manifold according to claim 1, wherein the manifold adaptors each further comprise a drain conduit extending between the connection ends of the manifold adaptors, with the drain conduit being in fluid communication with an interior of the drain sleeves, whereby the sequence of drain conduits and drain sleeves forms a fuel-draining network for drainage of fuel.

3. The fuel manifold according to claim 1, wherein each of the primary transfer tubes has a first guide with at least one guide surface on its periphery with seals provided between the primary transfer tubes and the primary conduit, and further wherein each of the secondary transfer tube has a second guide with at least one complementary guide surface on its periphery with seals provided between the secondary transfer tube and the secondary conduits, the complementary guide surface cooperating with the guide surface of the primary transfer tube when the primary transfer tube and the secondary transfer tube are connected between the adjacent manifold adaptors, whereby the primary transfer tube and the secondary transfer tube are blocked from rotating by the cooperation between the first and second guides.

4. The fuel manifold according to claim 3, wherein an inner section of the drain sleeve is shaped as a function of the first and second guides for blocking engagement between the drain sleeve and the guides, whereby the drain sleeve is blocked from rotating by the first and second guides.

5. The fuel manifold according to claim 4, wherein the guide surfaces are generally flat, and wherein drain channels are defined in the guide surfaces of the first and second guides to allow fuel circulation between the guides and the drain sleeve.

6. The fuel manifold according to claim 1, further comprising brackets mounted to at least one of the adjacent manifold adaptors for blocking a movement of the drain sleeve between the adjacent manifold adaptors by abutting against the drain sleeve.

7. A fuel manifold for a gas turbine engine comprising:
  manifold adaptors each supporting a nozzle for out-putting fuel from a fuel supply, each manifold adaptor having a primary conduit and a secondary conduit extending between connection ends of the manifold adaptor, the primary conduit and the secondary conduit being in fluid communication with the nozzle to supply fuel to a combustor of the gas turbine engine;
  transfer units between adjacent manifold adaptors, each transfer unit comprising:
  a primary transfer tube matingly connected at opposite ends to the primary conduits of the adjacent manifold adaptors for fuel circulation between the primary conduits, with seals provided been the primary transfer tube and the primary conduits, and at least one guide surface on a periphery of the primary transfer tube; and
  a secondary transfer tube matingly connected at opposite ends to the secondary conduits of the adjacent manifold adaptors for fuel circulation between the secondary conduits, with seals provided between the secondary transfer tube and the secondary conduits, and at least one complementary guide surface on a periphery of the secondary transfer tube the complementary guide surface cooperating with the guide surface of the primary transfer tube when the primary transfer tube and the secondary transfer tube are connected between the adjacent manifold adaptors, whereby the primary transfer tube and the secondary transfer tube are prevented from rotating by the cooperation between the guide surfaces and a drain sleeve connected at opposite ends to the adjacent manifold adaptors, the drain sleeve accommodating both the primary transfer tube and the secondary transfer tube so as to contain fuel leaks from the junction of the conduits and the transfer tubes, the drain sleeve in fluid communication with the manifold adaptor.

8. The fuel manifold according to claim 7, wherein the guide surface and the complementary guide surface are both generally flat.

9. The fuel manifold according to claim 7, wherein the primary transfer tube comprises a guide block defining the at least one guide surface, and the secondary transfer tube comprises another guide block defining the at least one complementary guide surface.

10. The fuel manifold according to claim 9, wherein each guide block has two guide surfaces, with all said guide surfaces being in a parallel surface when the primary transfer tube and the secondary transfer tube are assembled between the adjacent manifold adaptors.

11. The fuel manifold according to claim 9, wherein a flange projects radially from each of the transfer tubes for manipulating the transfer tubes, the flange having a small sectional area than the guide block.

12. The fuel manifold according to claim 7, wherein the manifold adaptors each further comprise a drain conduit extending between the connection ends of the manifold adaptors, with the drain conduit being in fluid communication with an interior of the drain sleeves, whereby the sequence of drain conduits and drain sleeves forms a fuel-draining network for drainage of fuel.

13. The fuel manifold according to claim 7, wherein an inner section of the drain sleeve is shaped as a function of the guide surfaces for blocking engagement between the drain sleeve and the guide surfaces, whereby the drain sleeve is blocked from rotating by the guide surfaces.

14. The fuel manifold according to claim 13, wherein the guide surfaces are generally flat, and wherein drain channels are defined in the guide surfaces of the guide blocks to allow fuel circulation between the guide blocks and the drain sleeve.

15. The fuel manifold according to claim 7, further comprising brackets mounted to at least one of the adjacent manifold adaptors for blocking a movement of the drain sleeve between the adjacent manifold adaptors by abutting against the drain sleeve.

* * * * *